United States Patent [19]
Le-Khac et al.

[11] Patent Number: 6,063,897
[45] Date of Patent: May 16, 2000

[54] ACID-TREATED DOUBLE METAL CYANIDE COMPLEX CATALYSTS

[75] Inventors: Bi Le-Khac, West Chester; Wei Wang, Upper Darby; Mahmoud K. Faraj, Newtown Square, all of Pa.

[73] Assignee: Arco Chemical Technology, L.P., Greenville, Del.

[21] Appl. No.: 09/072,852

[22] Filed: May 5, 1998

[51] Int. Cl.[7] .................................................. C08G 65/04
[52] U.S. Cl. .......................... 528/410; 502/154; 502/156; 528/411; 528/412
[58] Field of Search ................................... 528/410, 411, 528/412; 502/154, 156

[56] References Cited

U.S. PATENT DOCUMENTS

| | | | |
|---|---|---|---|
| 3,278,459 | 10/1966 | Herold | 260/2 |
| 3,404,109 | 10/1968 | Milgrom | 260/611 |
| 3,427,334 | 2/1969 | Behner | 260/429 |
| 3,427,335 | 2/1969 | Herold | 260/429 |
| 3,829,505 | 8/1974 | Herold | 260/611 |
| 4,472,560 | 9/1984 | Kuyper et al. | 526/120 |
| 4,477,589 | 10/1984 | van der Hulst et al. | 502/169 |
| 4,987,271 | 1/1991 | Watabe et al. | 568/621 |
| 5,158,922 | 10/1992 | Hinney et al. | 502/175 |
| 5,391,722 | 2/1995 | Chandalia et al. | 536/18.6 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,627,120 | 5/1997 | Le-Khac | 502/156 |
| 5,627,122 | 5/1997 | Le-Khac | 502/175 |

OTHER PUBLICATIONS

Schuchardt et al., "Preparation of High Molecular Weight Polyols Using Double Metal Cyanide Catalysts," 32nd Annual Polyurethane Technical Marketing Conference, Oct. 1–4, 1989, pp. 360–364.

Kuyper et al., "Hexacyanometallate Salts Used as Alkene–Oxide Polymerization Catalysts and Molecular Sieves", *J. Catalysis, 105*, pp. 163–174 (1987).

*Primary Examiner*—Robert Dawson
*Assistant Examiner*—D. Aylward
*Attorney, Agent, or Firm*—Stephen D. Harper; Jonathan L. Schuchardt

[57] ABSTRACT

The amount of high molecular weight impurity present in a polyether polyol produced by alkoxylation of an active hydrogen-containing initiator and a substantially noncrystalline highly active double metal cyanide complex catalyst may be advantageously lowered by treating the catalyst prior to use in polymerization with a protic acid. Suitable protic acids include phosphoric acid and acetic acid. The higher purity polyether polyols thereby produced are particularly useful in the preparation of slab and molded polyurethane foams, which tend to collapse or become excessively tight when elevated levels of high molecular tail are present in the polyether polyol.

21 Claims, No Drawings

ACID-TREATED DOUBLE METAL CYANIDE COMPLEX CATALYSTS

FIELD OF THE INVENTION

This invention pertains to a method of enhancing the performance of a highly active substantially noncrystalline double metal cyanide complex catalyst characterized by the presence of zinc hydroxyl groups. More particularly, the invention relates to contacting such a catalyst with a protic acid whereby the acid-treated catalyst thus obtained is capable of producing polyether polyols having reduced levels of high molecular tail. Such polyether polyols have enhanced processing latitude in the preparation of molded and slab polyurethane foam.

BACKGROUND OF THE INVENTION

Polyurethane polymers are prepared by reacting a di- or polyisocyanate with a polyfunctional, isocyanate-reactive compound, in particular, hydroxyl-functional polyether polyols. Numerous art-recognized classes of polyurethane polymers exist, for example cast elastomers, polyurethane RIM, microcellular elastomers, and molded and slab polyurethane foam. Each of these varieties of polyurethanes present unique problems in formulation and processing.

Two of the highest volume categories of polyurethane polymers are polyurethane molded and slab foam. In slab foam, the reactive ingredients are supplied onto a moving conveyor and allowed to rise freely. The resulting foam slab, often 6 to 8 feet (2 to 2.6 m) wide and high, may be sliced into thinner sections for use as seat cushions, carpet underlay, and other applications. Molded foam may be used for contoured foam parts, for example, cushions for automotive seating.

In the past, the polyoxypropylene polyether polyols useful for slab and molded foam applications have been prepared by the base-catalyzed propoxylation of suitable hydric initiators such as propylene glycol, glycerine, sorbitol, etc., producing the respective polyoxypropylene diols, triols, and hexols. As is now well documented, a rearrangement of propylene oxide to allyl alcohol occurs during base-catalyzed propoxylation. The monofunctional, unsaturated allyl alcohol bears a hydroxyl group capable of reaction with propylene oxide, and its continued generation and propoxylation produces increasingly large amount of unsaturated polyoxypropylene monols having a broad molecular weight distribution. As a result, the actual functionality of the polyether polyols produced is lowered significantly from the "normal" or "theoretical" functionality. Moreover, the monol generation places a relatively low practical limit on the molecular weight obtainable. For example, a base catalyzed 4000 Da (Dalton) molecular weight (2000 Da equivalent weight) diol may have a measured unsaturation of 0.05 meq/g, and will thus contain 30 mol percent unsaturated polyoxypropylene monol species. The resulting actual functionality will be only 1.7 rather than the "nominal" functionality of 2 expected for a polyoxypropylene diol. As this problem becomes even more severe as molecular weight increases, preparation of polyoxypropylene polyols having equivalent weights higher than about 2200–2300 Da is impractical using conventional base catalysis.

Double metal cyanide ("DMC") complex catalysts such as zinc hexacyanocobaltate complexes were found to be catalysts for propoxylation about 30 years ago. However, their high cost, coupled with modest activity and the difficulty of removing significant quantities of catalyst residues from the polyether product, hindered commercialization. The unsaturation level of polyoxyproylene polyols produced by these catalysts was found to be low, however.

The relatively modest polymerization activity of these conventional double metal cyanide-complex catalysts has been recognized as a problem by workers in the field. One method of improving polyether polyol yields obtained from such catalysts is proposed in U.S. Pat. No. 4,472,560. This publication proposes a process for epoxide polymerization using as a catalyst a double metal cyanide-type compound, wherein said process is carried out in the presence of one or more non-metal containing acids of which a 0.1N solution in water at 25° C. has a pH not exceeding 3. The acid is introduced as a solution in an appropriate solvent with stirring into a suspension of a double metal cyanide-metal hydroxide complex. After evaporation of volatile compounds, the solid thus obtained is used or stored for use as a polymerization catalyst without any filtration or centrifugation. Example 1 of the patent illustrates the preparation of a solid catalyst containing approximately 1 HCl per mole of $Zn_3[Co(CN)_6]_2$. Example 16 shows that the yield of polyether polyol is improved about 90% when 2 HCl per mole of $Zn_3[Co(CN)_6]_2 \cdot ZnCl_2$ is present. No mention is made of the effect of the acid on other characteristics of the polyether polyol, such as the amount of high molecular weight tail.

Recently, as indicated by U.S. Pat. Nos. 5,470,813, 5,482,908, 5,545,601, and 5,712,216, researchers at ARCO Chemical Company have produced substantially noncrystalline or amorphous DMC complex catalysts with exceptional activity, which have also been found to be capable of producing polyether polyols having unsaturation levels in the range of 0.002 to 0.007 meq/g (levels previously obtainable only through the use of certain solvents such as tetrahydrofuran). The polyoxypropylene polyols thus prepared were found to react in a quantitatively different manner from prior "low" unsaturation polyols in certain applications, notably cast elastomers and microcellular foams. However, substitution of such polyols for their base-catalyzed analogs in molded and slab foam formulations is not straightforward. In molded foams, for example, foam tightness increases to such an extent that the necessary crushing of the foams following molding is difficult if not impossible. In both molded foams and slab foams, foam collapse often occurs, rendering such foams incapable of production. These effects occur even when the high actual functionality of such polyols is purposefully lowered by addition of lower functionality polyols to achieve an actual functionality similar to that of base-catalyzed polyols.

DMC-catalyzed polyoxypropylene polyols have exceptionally narrow molecular weight distribution, as can be seen from viewing gel permeation chromatograms of polyol samples. The molecular weight distribution is often far more narrow than analogous base-catalyzed polyols, particularly in the higher equivalent weight range, for example. Polydispersities less than 1.5 are generally obtained, and polydispersities in the range of 1.05 to 1.15 are common. In view of the low levels of unsaturation and low polydispersity, it was surprising that DMC-catalyzed polyols did not prove to be "drop-in" replacements for base-catalyzed polyols in polyurethane foam applications. Because propoxylation with modern DMC catalysts is highly efficient, it would be very desirable to be able to produce DMC-catalyzed polyoxypropylene polyols which can be used in slab and molded polyurethane foam applications without causing excessive foam tightness or foam collapse.

Surprisingly, when one or more molar equivalents of an acid such as hydrochloric acid are combined with a highly active, substantially noncrystalline double metal cyanide complex catalyst of the type described in U.S. Pat. Nos. 5,470,813, 5,482,908, 5,545,601 and 5,712,216, complete deactivation of the catalyst is observed. This result was unexpected in view of the teaching of U.S. Pat. No. 4,472,560 that such acids will function as promoters for conventional double metal cyanide complex catalysts.

SUMMARY OF THE INVENTION

It has now been discovered that polyether polyols which contain polymerized propylene oxide and which mimic the behavior of base-catalyzed analogs in slab and molded polyurethane foams may be obtained using a highly active substantially noncrystalline double metal cyanide complex catalyst if the catalyst is first treated with a protic acid. Excess acid is separated from the acid-treated catalyst prior to its use in epoxide polymerization.

DETAILED DESCRIPTION OF THE INVENTION

Intensive research into the chemical and physical characteristics of polyoxypropylene polyols has led to the discovery that despite the narrow molecular weight distribution and low polydispersities of polyols catalyzed by substantially noncrystalline highly active double metal cyanide complex catalysts, small high molecular weight fractions are responsible in large part for excessive foam tightness (stabilization) and foam collapse.

A comparison of gel permeation chromatograms of base-catalyzed and DMC-catalyzed polyols exhibit significant differences. For example, a base-catalyzed polyol exhibits a significant "lead" portion of low molecular weight oligomers and polyoxypropylene monols prior to the main molecular weight peak. Past the peak, the weight percentage of higher molecular weight species falls off rapidly. A similar chromatogram of a DMC-catalyzed polyol reveals a tightly centered peak with very little low molecular weight "lead" portion, but with a higher molecular weight portion (high molecular weight "tail") which shows the presence of measurable species at very high molecular weights. Due to the low concentration of these species, generally less than 2–3 weight percent of the total, the polydispersity is low. However, intensive research has revealed that the higher molecular weight species, despite their low concentrations, are largely responsible for the abnormal behavior of DMC-catalyzed polyols in molded and slab polyurethane foam applications. It is surmised that these high molecular weight species exert a surfactant-like effect which alters the solubility and hence the phase-out of the growing polyurethane polymers during the isocyanate-polyol reaction.

By fractionation and other techniques, it has been determined that the high molecular weight tail may be divided into two molecular weight fractions based on the different effects these fractions influence. The first fraction, termed herein "intermediate molecular weight tail," consists of polymeric molecules having molecular weights ranging from about 20,000 Da to 400,000 Da, and greatly alters the foam tightness in molded foam and high resilience (HR) slab foam. A yet higher molecular weight fraction (hereinafter, "ultra-high molecular weight tail") dramatically influences foam collapse both in molded foam and in slab foam of both conventional and high resilience (HR) varieties.

Thus far, no completely effective method of avoiding production of high molecular weight tail during propoxylation employing DMC complex catalysts has been known in the art. Use of processes such as continuous addition of starter in both batch and continuous polyol preparation, as disclosed in WO 97/29146 and U.S. Pat. No. 5,689,012, have proven partially effective in lowering the amount of high molecular weight tail in some cases. However, the portion which remains is still higher than is optimal if the polyether polyol is to be used for preparation of polyurethane foam. Commercially acceptable methods for removing or destroying high molecular weight tail have also not been developed. Destruction of high molecular weight species by cleavage induced by peroxides is somewhat effective, but also cleaves the desired molecular weight species as well. Fractionation with supercritical $CO_2$ is effective with some polyols but not others, and is too expensive to be commercially acceptable.

It has been observed that the highly active substantially noncrystalline double metal cyanide complex catalysts that contain higher levels of free (unbonded) zinc hydroxyl groups ("Zn—OH") tend to be the catalysts which produce polyether polyols having higher amounts of high molecular tail impurity. Without wishing to be bound by theory, it is thought that the zinc hydroxyl groups are in some way involved in the formation of such impurities.

It has unexpectedly been found that the problem of reducing the high molecular tail in a polyether polyol obtained using a substantially amorphous highly active double metal cyanide complex catalyst characterized by the presence of zinc hydroxyl groups may be readily solved by contacting the catalyst with a protic acid for a time and at a temperature effective to react the catalyst with at least a portion of the protic acid. In this context, the term "react" includes chemical interactions which lead to the formation of covalent or ionic bonds between the protic acid and the catalyst such that the reacted protic acid becomes in some fashion bound to or otherwise associated with the catalyst and is not readily removed by solvent washing, evaporation or other such means. At least a portion, and preferably essentially all, of any excess (unreacted) protic acid is separated from the acid-treated catalyst prior to use in an epoxide polymerization reaction. By proper adjustment of the protic acid to catalyst ratio and careful selection of the acid treatment conditions, the time required to activate the catalyst and the rate at which the catalyst polymerizes an epoxide may also be significantly improved as compared to catalyst which has not been contacted with acid.

The choice of protic acid is not believed to be critical, although as mentioned previously the use of hydrogen halides such as hydrochloric acid at high concentrations should be avoided. Protic acids include the class of chemical substances, both organic and inorganic, which when placed in water are capable of donating hydrogen ions ($H^+$) to water molecules to form hydronium ions ($H_3O^+$). Both strong and weak protic acids may be utilized in the present invention. Illustrative examples of suitable protic acids include, but are not limited to, phosphorus oxyacids (e.g., phosphorous acid, hypophosphorous acid, phosphoric acid), sulfur oxyacids (e.g., sulfuric acid, sulfonic acids), carboxylic acids (e.g., acetic acid, halogenated acetic acids), nitrogen oxyacids (e.g., nitric acid) and the like. Phosphorus acid, sulfuric acid, and acetic acid are particularly preferred protic acids.

The optimum amount of protic acid used relative to the amount of catalyst to be treated will vary depending upon, among other factors, the acidity (i.e., acid strength or pKa) of the protic acid and the treatment conditions (acid concentration, temperature, contact time, etc.). At a minimum, the ratio of protic acid to catalyst must be sufficiently high so as to reduce the amount of high molecular weight tail the catalyst produces when used to catalyze the formation of a polyether polyol. However, care must be taken to avoid using such a large amount of protic acid that the activity of the catalyst is adversely affected. It will normally be advantageous to select acid treatment conditions such that the polymerization activity of the untreated catalyst (as measured by the quantity of propylene oxide reacted per minute per 250 ppm catalyst at 105° C.) is not reduced by more than 20% (more preferably, not more than 10%). Routine experimentation wherein the acid:catalyst ratio is systematically varied at a given set of reaction conditions will permit rapid determination of the preferred range of ratios. Generally speaking, when the protic acid is a relatively strong acid such as hydrochloric acid the amount of acid used should be low relative to the quantity of catalyst to be treated. Conversely, relatively high concentrations of weak protic acid such as acetic acid are typically favored.

Without wishing to be bound by theory, it is believed that the improvements in catalyst performance realized by application of the present invention are at least in part due to the reaction of the protic acid with the zinc hydroxyl groups initially present in the catalyst. That is, it has been observed that when the catalyst is treated with a protic acid such as acetic acid, the infrared absorption bands assigned to free (unassociated) Zn—OH are largely eliminated and replaced with absorption bands attributed to zinc acetate groups.

The double metal cyanide catalysts treated with the protic acid are substantially amorphous (i.e., non-crystalline) and are comprised of a double metal cyanide, an organic complexing agent and a metal salt. The catalyst has very high polymerization activity; i.e., it is capable of polymerizing propylene oxide at a rate in excess of 3 g (more preferably, 5 g) propylene oxide per minute per 250 ppm catalyst (based on the combined weight of initiator and propylene oxide) at 105° C. Double metal cyanide complex catalysts meeting these requirements and methods for their preparation are described in detail in U.S. Pat. Nos. 5,470,813, 5,482,908, 5,545,601, and 5,712,216, each of which is incorporated herein by reference in its entirety.

The double metal cyanide most preferably is zinc hexacyanocobaltate, while the metal salt (used in excess in the reaction to form the double metal cyanide) is preferably selected from the group consisting of zinc halides (zinc chloride being especially preferred), zinc sulphate and zinc nitrate. The organic complexing agent is desirably selected from the group consisting of alcohols, ethers and mixtures hereof, with water soluble aliphatic alcohols such as tert-butyl alcohol being particularly preferred. The double metal cyanide complex catalyst is desirably modified with a polyether, as described in U.S. Pat. Nos. 5,482,908 and 5,545,601.

The catalyst is contacted with the protic acid for a time and at a temperature effective to react the catalyst with at least a portion of the protic acid. The extent of reaction may be readily monitored by standard analytical techniques. For example, where the protic acid is phosphoric acid or sulfuric acid, the elemental composition of the treated catalyst may be measured to determine the amount of residual phosphorus or sulfur in the catalyst after removal of any unreacted protic acid. When a carboxylic acid such as acetic acid is utilized, the relative concentration of zinc carboxylate groups as compared to free zinc hydroxyl groups may be ascertained by infrared spectroscopy.

Generally speaking, the catalyst treatment method of this invention may be most conveniently practiced by suspending the catalyst (which is normally in a powder or particulate form) in a suitable liquid medium having the protic acid dissolved therein. The suspension is heated at a suitable temperature for the desired period of time, preferably while being agitated or otherwise mixed. In an alternative embodiment, the catalyst is deployed in a fixed bed with the liquid medium containing the protic acid being passed through the catalyst bed under conditions effective to achieve the desired level of catalyst reaction with the protic acid. Since many of the protic acids usable in the present invention are water-soluble, it will normally be advantageous for the liquid medium to be aqueous in character. While water alone could be used, one or more water miscible organic solvents such as a lower aliphatic alcohol or tetrahydrofuran may also be present.

The acid treatment procedure of this invention thus may be conveniently incorporated into the catalyst preparation procedures described in U.S. Pat. Nos. 5,470,813, 5,482,908, 5,545,601 and 5,712,216. The highly active substantially amorphous double metal cyanide complex catalysts taught by these patents are commonly synthesized by combining an aqueous solution of a metal cyanide salt such as potassium hexacyanocobaltate with an aqueous solution of an excess of a metal salt such as zinc chloride. The double metal cyanide thereafter precipitates from solution to form an aqueous suspension. An organic complexing agent such as a water soluble aliphatic alcohol (e.g., tert-butyl alcohol) may be present in one or both of the initial aqueous solutions or added to the aqueous suspension. The resulting aqueous suspension may be conveniently treated with protic acid in accordance with the present invention prior to isolating the catalyst in dry form as described in the aforementioned patents. Alternatively, of course, a dry soluble metal cyanide complex catalyst prepared by the prior art procedures or a wet filter cake of such a catalyst may be resuspended in a liquid medium and treated with acid if so desired.

As mentioned previously, the type of acid selected for use will affect the reaction conditions needed to modify the catalytic performance to the desired extent. Generally speaking, the use of a weak acid such as acetic acid will require higher acid concentrations in the liquid medium, higher reaction temperatures, and/or longer reaction times than will be the case for a strong protic acid such as sulfuric acid or hydrochloric acid. Suitable acid concentrations thus may typically be in the range of from 0.01 to 10 N, suitable reaction temperatures may be in the range of from 0° C. to 200° C., and suitable reaction times may be in the range of from 1 minute to 1 day.

After contacting with the protic acid, the treated catalyst is separated from unreacted (excess) protic acid by any suitable means such as filtration, centrifugation or decantation. Preferably, all or essentially all of the unreacted protic acid is removed. To achieve this, it will often be desirable to wash unreacted protic acid from the catalyst using water, a water-miscible organic solvent such as an alcohol, a mixture of water and a water-soluble organic solvent, or an organic solvent in which the protic acid is soluble. The washing solvent may, for example, be passed through a filter cake of the catalyst or the catalyst may be resuspended in the washing solvent and then separated again by filtration or other such means. After washing, the acid-treated catalyst may be dried if so desired to reduce the amount of residual washing solvent or other volatiles. Typically, the drying step is performed at relatively moderate conditions (e.g., room temperature to 100° C.). A vacuum may be applied to accelerate the rate of drying.

In an alternative embodiment of the invention, the double metal cyanide complex catalyst is exposed to the protic acid in the vapor phase. For example, a gaseous stream containing the protic acid may be passed through a filter cake of the catalyst at a suitable temperature until the desired extent of catalyst reaction is accomplished. This approach may be conveniently utilized where the protic acid selected for use in treating the catalyst is relatively volatile (e.g., acetic acid or other light carboxylic acid). Residual unreacted protic acid is separated from the acid-treated catalyst prior to use of the catalyst in epoxide polymerization.

The concentration of the acid-treated catalyst when used in an epoxide polymerization process is generally selected such that sufficient catalyst is present to polymerize the epoxide at a desired rate or within a desired period of time. It is desirable to minimize the amount of catalyst employed, both for economic reasons and to avoid having to remove the catalyst from the polyether polyol produced. The activities of the catalysts obtained by practice of this invention are extremely high; catalyst concentrations in the range of from 5 to 50 parts per million based on the combined weight of active hydrogen-containing initiator and epoxide thus are typically sufficient.

The catalysts obtained by practice of this invention are particularly useful for polymerizing propylene oxide alone since propylene oxide homopolymerization is particularly apt to form undesirably high levels of high molecular weight tail. However, the process may also be employed to polymerize other epoxides such as ethylene oxide, 1-butene oxide and the like either alone or in combination with other epoxides. For example, copolymers of ethylene oxide and propylene oxide may be produced.

The active hydrogen-containing initiator may be any of the substances known in the art to be capable of alkoxylation by epoxide using a double metal cyanide complex catalyst and is selected based on the desired functionality and molecular weight of the polyether polyol product. Typically, the initiator (which may also be referred to as "starter") will be oligomeric in character and have a number average molecular weight in the range of from 100 to 1000 and a functionality (number of active hydrogens per molecule) of from 2 to 8. Alcohols (i.e., organic compounds containing one or more hydroxy groups) are particularly preferred for use as initiators.

The polymerization may be conducted using any of the alkoxylation procedures known in the double metal cyanide complex catalyst art. For instance, a conventional batch process may be employed wherein the catalyst and initiator are introduced into a batch reactor. The reactor is then heated to the desired temperature (e.g., 70 to 150° C.) and an initial portion of epoxide introduced. Once the catalyst has been activated, as indicated by a drop in pressure and consumption of the initial epoxide charge, the remainder of the epoxide is added incrementally with good mixing of the reactor contents and reacted until the desired molecular weight of the polyether polyol product is achieved. The initiators, monomers and polymerization conditions described in U.S. Pat. No. 3,829,505 (incorporated herein by reference in its entirety) may be readily adapted for use in the present process.

Alternatively, a conventional continuous process may be employed whereby a previously activated initiator/catalyst mixture is continuously fed into a continuous reactor such as a continuously stirred tank reactor (CSTR) or tubular reactor. A feed of epoxide is introduced into the reactor and the product continuously removed. The process of this invention may also be readily adapted for use in continuous addition of starter (initiator) processes, either batch or continuous operation, such as those described in detail in U.S. application Ser. No. 08/597,781, filed Feb. 7, 1996, now U.S. Pat. No. 5,777,177, and U.S. Pat. No. 5,689,012, both of which are incorporated herein by reference in their entirety.

The polyether polyols produced by operation of the process of the invention preferably have functionalities, molecular weights and hydroxyl numbers suitable for use in molded and slab foams. Nominal functionalities range generally from 2 to 8. In general, the average functionality of polyether polyol blends ranges from about 2.5 to 4.0. The polyether polyol equivalent weights generally range from somewhat lower than 1000 Da to about 5000 Da. Unsaturation is preferably 0.015 meq/g or lower, and more preferably in the range of 0.002 to about 0.008 meq/g. Hydroxyl numbers preferably range from 10 to about 80. Blends may, of course, contain polyols of both lower and higher functionality, equivalent weight, and hydroxyl number.

The performance of polyether polyols may be assessed by testing these polyether polyols in the "Tightness Foam Test" (TFT) and "Super Critical Foam Test" (SCFT). Polyether polyols which pass these tests have been found to perform well in commercial slab and molded foam applications, without excessive tightness, and without foam collapse. The SCFT consists of preparing a polyurethane foam using a formulation which is expressly designed to magnify differences in polyether polyol behavior.

In the SCFT, a foam prepared from a given polyether polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyether polyol, 100 parts; water, 6.5 parts; methylene chloride, 15 parts; Niax® A-1 amine-type catalyst, 0.10 parts; T-9 tin catalyst, 0.34 parts; L-550 silicone surfactant, 0.5 parts. The foam is reacted with a mixture of 80/20 2,4- and 2,6-toluene diisocyanate at an index of 110. The foam may be conveniently poured into a standard 1 cubic foot cake box, or a standard 1 gallon ice cream container. In this formulation, conventionally prepared, i.e. base catalyzed polyether polyols having high secondary hydroxyl cause the foam to settle approximately 10–20%, generally 15%±3%, whereas polyether polyols prepared from DMC catalysts containing unacceptably high levels of high molecular weight tail cause the foam to collapse by approximately 35–70%.

While the SCFT is used to assess differences in foam stability, the Tightness Foam Test (TFT) magnifies reactivity differences, as reflected by foam porosity. In the tightness foam test, the resin component consists of 100 parts polyether polyol, 3.2 parts water (reactive blowing agent), 0.165 parts C-183 amine catalyst, 0.275 parts T-9 tin catalyst, and 0.7 parts L-620 silicone surfactant. The resin component is reacted with 80/20 toluene diisocyanate at an index of 105. Foam tightness is assessed by measuring air flow in the conventional manner. Tight foams have reduced air flow.

The analytical procedure useful for measuring the quantity of high molecular weight tail in a given DMC-catalyzed polyether polyol is a conventional HPLC technique, which can easily be developed by one skilled in the art. The molecular weight of the high molecular weight fraction may be estimated by comparing its elution time in the GPC column with that of a polystyrene standard of appropriate molecular weight. As is well known, high molecular weight fractions elute from a GPC column more rapidly than lower molecular weight fractions, and to aid in maintaining a stable baseline, it is appropriate, following the elution of the high molecular weight fraction, to divert the remainder of the HPLC eluate to waste, rather than allowing it to pass through the detector, overloading the latter. Although many suitable detectors may be utilized, a convenient detector is an evaporative light scattering detector (ELSD) such as those commercially available.

In the preferred analysis method, a Jordi Gel DVB $10^3$ Angstrom column,10×250 mm, 5 micron particle size, is employed with a mobile phase which consists of tetrahydrofuran. The detector used is a Varex Model IIA evaporative light scattering detector. Polystyrene stock solutions are made from polystyrenes of different molecular weights by appropriate dilution withtetrahydrofuran, to form standards containing 2, 5, and 10 mg/L of polystyrene. Samples are prepared by weighing 0.1 gram of polyether polyol into a 1 ounce bottle, and adding tetrahydrofuran to the sample to bring the total weight of sample and tetrahydrofuran to 10.0 grams. Samples of the 2, 5, and 10 mg/L polystyrene calibration solutions are sequentially injected into the GPC column. Duplicates of each polyether polyol sample solution are then injected, following by a reinjection of the various polystyrene standards. The peak areas for the polystyrene standards are electronically integrated, and the electronically integrated peaks for the two sets of each candidate polyol are electronically integrated and averaged. Calculation of the high molecular weight tail in ppm is then performed by standard data manipulation techniques.

Having generally described this invention, a further understanding can be obtained by reference to certain specific examples which are provided herein for purposes of illustration only and are not intended to be limiting unless otherwise specified.

EXAMPLES

Example 1

This example demonstrates the treatment of a double metal cyanide complex catalyst with acetic acid in accordance with the invention.

A 62.5% solution of zinc chloride in water (120 g) was diluted using a mixture of 230 mL deionized water and 50 mL tert-butyl alcohol. Separately, 7.5 g potassium hexacyanocobaltate was dissolved in a mixture of 100 mL deionized water and 20 mL tert-butyl alcohol. The potassium hexacyanocobaltate solution was added to the zinc chloride solution over 35 minutes while homogenizing at 20% of the maximum intensity. After addition was completed, homogenization was continued at 40% of the maximum intensity for 10 minutes. The homogenizer was then stopped and a solution of 8 g of a 1000 molecular weight polypropylene glycol diol in a mixture of 50 mL deionized water and 2 mL tetrahydrofuran added to the mixture. After stirring slowly for 3 minutes, the mixture was pressure filtered at 40 psig through a 20 micron nylon membrane. The catalyst cake was reslurried in a mixture of 130 mL tert-butyl alcohol, 55 mL deionized water and 3 g acetic acid at 40% of the maximum homogenization intensity for 10 minutes. The homogenizer was then stopped and 2 g of the polypropylene glycol diol dissolved in 2 g tetrahydrofuran was added. After stirring slowly for 3 minutes, the slurry was refiltered as previously described. The catalyst cake was reslurried in 185 mL tert-butyl alcohol at 40% of the maximum homogenization intensity for 10 minutes. The homogenizer was then stopped and 1 g of the polypropylene glycol diol in 2 g tetrahydrofuran was added. After stirring slowly for 3 minutes, the slurry was refiltered as described previously. The catalyst cake thus obtained was dried at 60° C. under vacuum (30 in Hg) until a constant weight was obtained.

Example 2

This example illustrates an alternative procedure for treating a double metal cyanide complex catalyst with acetic acid in accordance with the present invention.

A 62.5% aqueous solution (302.6 g) of zinc chloride was diluted with 580 mL deionized water and 126 mL tert-butyl alcohol. Separately, a solution of 18.9 g potassium hexacyanocobaltate in 252 g deionized water and 50 mL tert-butyl alcohol was prepared. The potassium hexacyanocobaltate solution was added to the zinc chloride solution over 2 hours at 50° C. under 900 rpm agitation. After addition was completed, agitation was continued for another hour at 900 rpm. Agitation was decreased to 400 rpm and a solution of 15 g of a 1000 molecular weight polypropylene glycol diol in 120 mL deionized water and 10 mL tetrohydrofuran was added. After stirring for 3 minutes, the mixture was pressure filtered at 40 psig through a 20 micron nylon membrane. The catalyst cake was reslurried in a mixture of 328 mL tert-butyl alcohol in 134 mL deionized water at 50° C. for 1 hour (900 rpm agitation). The agitation rate was decreased to 400 rpm and 5.1 g of the polypropylene glycol diol dissolved in 5.1 g tetrahydrofuran added. After stirring for 3 minutes, the mixture was pressure filtered as previously described. The catalyst cake was reslurried in 185 mL tert-butyl alcohol and stirred 1 hour at 50° C. (900 rpm agitation). After decreasing the agitation rate to 400 rpm, a solution of 2.5 g of the polypropylene glycol diol in 5 g tetrahydrofuran was added. After stirring 3 minutes, 70 g acetic acid was added and the mixture stirred for 2 hours before pressure filtering as previously described. The catalyst cake was dried at 60° C. under vacuum (30 in Hg) until a constant weight was obtained.

Examples 3A–3C

These examples demonstrate the treatment of zinc hexacyanocobaltate complex catalyst with a variety of protic acids.

A 62.5% aqueous solution (302.6 g) of zinc chloride was diluted with 580 mL deionized water and 126 mL tert-butyl alcohol. Separately, a solution of 18.9 g potassium hexacyanocobaltate in 252 mL deionized water and 50 mL tert-butyl alcohol was prepared, then added to the zinc chloride solution over 2 hours at 50° C. (900 rpm). After addition was completed, agitation was continued at 900 rpm for 1 hour before decreasing the agitation rate to 400 rpm and adding a solution of 15 g of a 1000 molecular weight polypropylene glycol diol in 120 mL deionized water and 10 mL tetrahydrofuran. After stirring for 3 minutes, the mixture was pressure filtered at 40 psig through a 20 micron nylon membrane. The catalyst cake was reslurried in a mixture of 328 mL tert-butyl alcohol and 134 mL deionized water at 50° C. for 1 hour (900 rpm agitation). The slurry was then divided into three equal portions (A,B,C). Each portion was combined with aqueous acid as follows:

| Portion | Acid |
| --- | --- |
| A | 0.33 g acetic acid + 8 g water |
| B | 0.54 g 37% HCl + 8 g water |

-continued

| Portion | Acid |
|---------|------|
| C | 0.36 g hypophosphorus acid + 8 g water |

Each portion was then homogenized at 40% of the maximum intensity for 10 minutes, then combined with 1.7 g of the polypropylene glycol diol dissolved in 2 g tetrahydrofuran. After stirring slowly for 3 minutes, each portion was pressure filtered as described previously, and then reslurried in 156 mL tert-butyl alcohol at 50° C. for 10 minutes while mixing with a homogenizer. Homogenization was stopped and 0.83 g of the polypropylene glycol diol dissolved in 2 g tetrahydrofuran was added to each portion. After stirring slowly for 3 minutes, the catalyst was again collected by pressure filtration and then dried at 60° C. under vacuum (30 in Hg) until a constant weight was obtained.

Example 4

This example demonstrates the effect of treating highly active substantially amorphous double metal cyanide complex catalysts characterized by the presence of zinc hydroxyl groups with varying concentrations of acetic acid. The catalysts used were comprised of zinc hexacyanocobaltate, zinc chloride, tert-butyl alcohol (organic complexing agent), and a polyether polyol and had been prepared in accordance with the general procedures outlined in U.S. Pat. No. 5,482,908. Acid treatment was performed by stirring the wet filter cake in aqueous tert-butyl alcohol solutions of acetic acid (1, 5 and 15% concentrations) following the methods described in Example 1 hereinabove.

The catalytic performances of the acid-treated catalysts were compared with that of a control catalyst which had not been acid-treated in the preparation of 3200 number average molecular weight polypropylene glycol triol containing 12 wt. % ethylene oxide. The polymerizations were carried out in a 1L Buchi reactor at 130° C. using a 2-hour feed time after initiation of epoxide addition and a catalyst concentration of 30 ppm based on the final weight of the polypropylene glycol triol. The results obtained are shown in the following table.

TABLE I

| Example | 4A[1] | 4B | 4C |
|---------|-------|-----|-----|
| Acid Treatment Product | None | 5% Acetic | 15% Acetic |
| Hydroxyl No., mg KOH/g | 51.9 | 51.5 | 52.0 |
| Molecular Weight Distribution (GPC) | 1.027 | 1.028 | 1.057 |
| Viscosity, cps | 521 | 531 | 558 |
| High Molecular Weight Tail, ppm | | | |
| >100 K | 171 | 172 | 73 |
| >400 K | 15 | 14 | ND |
| Supercritical Foam Test | Failed | Failed | Passed |

[1]Comparative (control)
ND = None Detected

When the acetic acid concentration during acid treatment was only 1 or 5%, little reduction in the amount of high molecular tail was observed as compared to the control catalyst (compare Example 4B with Example 4A). This was consistent with IR spectroscopic analysis of the acid-treated catalysts, which showed no change in the sharp absorption bands at 3609 cm$^{-1}$ (assigned to free or unbonded Zn—OH stretching vibration) and 642 cm$^{-1}$ (assigned to Zn—OH bending vibration). A weak absorption band was visible at 1620 cm$^{-1}$ which is assigned to the carboxylate (zinc acetate) stretching vibration. In the catalyst which had been treated with 15% acetic acid for 2 hours, however, the IR absorption bands at 3609 cm$^{-1}$ and 642 cm$^{-1}$ were no longer present and the band at 1620 cm$^{-1}$ was more intense (indicating that a higher degree of conversion of the zinc hydroxyl groups to zinc acetate groups had taken place). The polypropylene glycol triol prepared using the catalyst treated with 15% acetic acid (Example 4C) contained undetectable levels of impurities having molecular weights in excess of 400,000 and passed the Supercritical Foam Test.

Example 5

Portions of a highly active substantially noncrystalline double metal cyanide complex catalyst comprised of zinc hexacyancobaltate, tert-butyl alcohol, zinc chloride and polyether polyol and prepared in accordance with the procedure described in U.S. Pat. No. 5,482,908 were treated with either phosphoric acid or sulfuric acid. The residual phosphorus in the phosphoric acid-treated catalyst was only 0.4 wt % by elemental analysis. The catalytic performance of each catalyst was compared to that of a control (no acid treatment) in the preparation of a 3000 number average molecular weight polypropylene glycol triol using 40 ppm catalyst (based on final weight of the polypropylene glycol triol) at 1050° C. The control catalyst required approximately 100 minutes until rapid polymerization of the propylene oxide was initiated. In contrast, the initiation (activation) times for the acid-treated catalysts under comparable conditions were only about 30 to 40 minutes. Moreover, the proportion of the polypropylene glycol triols made from the acid-treated catalysts having a molecular weight in excess of 100,000 was reduced by about 35% as compared to the triol prepared using the control (untreated) catalyst.

Example 6

The effects of treating a highly active substantially noncrystalline double metal cyanide catalyst of the type utilized in Examples 4 and 5 with varying amounts of phosphoric acid were examined. To prepare Catalyst 6-B, for example, a solution of 0.83 g of 85% phosphoric acid dissolved in a mixture of 80 g tert-butyl alcohol and 20 g distilled water was used at room temperature to treat the catalyst. Zinc hexacyanocobaltate complex catalyst (6 g) was added slowly and the resulting mixture stirred at room temperature for 2 hours. The catalyst was collected by filtration and dried for 4 hours at 50° C. Catalysts 6-C and 6-D were prepared in a similar manner using higher phosphoric acid concentrations. The catalysts were evaluated in the preparation of a 3000 molecular weight polypropylene glycol triol at 120° C. (30 ppm catalyst). The results obtained are summarized in the following table.

TABLE II

| Example | H$_3$PO$_4$/Double Metal Cyanide molar ratio | Activation Time (min.) | P/Co[1] | High Molecular Tail, ppm >100 K | >400 K | Supercritical Foam Test |
|---------|----------------------------------------------|------------------------|---------|----------------------------------|--------|-------------------------|
| 6-A* | 0 | 20–25 | 0 | 150–160 | 15–20 | failed (collapse) |
| 6-B | 1.2 | 5–7 | 0.070 | 135 | n/a | not tested |
| 6-C | 2.2 | 8 | 0.394 | 115 | n/a | passed[3] |

TABLE II-continued

| Example | $H_3PO_4$/Double Metal Cyanide molar ratio | Activation Time (min.) | P/Co[1] | High Molecular Tail, ppm >100 K | High Molecular Tail, ppm >400 K | Super-critical Foam Test |
|---|---|---|---|---|---|---|
| 6-D | 3.8 | 49 | 0.561 | n/a[2] | n/a[2] | not tested |

*Comparative example (control)
[1]By analysis in catalyst
[2]Catalyst deactivated during polymerization
[3]The foam settled approximately 37% and a split in the foam was observed.

Examples 7–9

Polypropylene glycol triols of approximately 3200 number average molecular weight and containing 12 wt % ethylene oxide (the balance being propylene oxide) were prepared using a polymerization temperature of 130° C. and an epoxide feed time of 2 hours to compare the performance of acid-treated Catalysts 3B and 3C (see Example 3) with that of an analogous double metal cyanide catalyst which had not been treated with acid. The results obtained are shown in the following table.

TABLE III

| Example | 7[1] | 8 | 9 |
|---|---|---|---|
| Catalyst | Control | 3B | 3C |
| Acid Used | None | HCl | Hypophosphorous |
| Acid/Zn Molar Ratio Product | — | 0.02 | 0.06 |
| Hydroxy No., mg KOH/g | 51.9 | 51.8 | 52.6 |
| Molecular Weight Distribution (GPC) | 1.027 | 1.030 | 1.032 |
| Viscosity, cps | 521 | 540 | 547 |
| High Molecular Weight Tail, ppm | | | |
| >100 K | 171 | 153 | 153 |
| >400 K | 15 | 7 | ND |

[1]Comparative
ND = None detected

Both of the acid-tested catalysts yielded products containing lower levels molecular tail impurities (particularly those impurities having a molecular weight greater than 400,000) than did the control catalyst used in Example 7. At the same time, no adverse effects of acid treatment on other product characteristics such as hydroxy number, polydispersity or viscosity were observed.

We claim:

1. A method of enhancing the performance of a highly active substantially noncrystalline double metal cyanide complex catalyst characterized by the presence of zinc hydroxyl groups, said method comprising contacting said catalyst with a protic acid for a time and at a temperature effective to react the catalyst with at least a portion of the protic acid and separating at least a portion of any excess protic acid from the catalyst.

2. The method of claim 1 wherein the protic acid is a carboxylic acid.

3. The method of claim 2 wherein the protic acid is acetic acid or a halogenated derivative thereof.

4. The method of claim 1 wherein the protic acid is an inorganic acid.

5. The method of claim 4 wherein the inorganic acid is selected from the group consisting of sulfur oxyacids and phosphorus oxyacids.

6. The method of claim 1 wherein said contacting is performed using a suspension of the catalyst in a liquid medium in which the protic acid is soluble.

7. The method of claim 6 wherein the protic acid is present at a concentration of 0.01 N to 10 N in the liquid medium.

8. The method of claim 6 wherein the step of separating unreacted protic acid from the catalyst is accomplished by filtering the suspension to obtain a filter cake comprising the catalyst.

9. The method of claim 8 comprising the additional step of washing the filter cake with one or more solvents in which the unreacted protic acid is soluble.

10. The method of claim 1 wherein the catalyst is comprised of a double metal cyanide, an organic complexing agent and a metal salt.

11. The method of claim 10 wherein the double metal cyanide is zinc hexacyanocobaltate.

12. The method of claim 10 wherein the organic complexing agent is a water soluble aliphatic alcohol.

13. The method of claim 10 wherein the metal salt is a zinc halide.

14. A method of enhancing the performance of a highly active substantially noncrystalline double metal cyanide complex catalyst comprised of zinc hexacyanocobaltate, a water soluble aliphatic alcohol complexing agent, and a zinc halide and characterized by the presence of zinc hydroxyl groups, said method comprising forming a suspension of the catalyst in a liquid medium containing a protic acid selected from the group consisting of carboxylic acids, sulfur oxyacids, phosphorus oxyacids and mixtures thereof, contacting the catalyst with the protic acid in the suspension for a time and at a temperature effective to react the catalyst with at least a portion of the protic acid, and separating essentially all of any excess protic acid from the catalyst by filtering the suspension to obtain a filter cake comprising the catalyst.

15. The method of claim 14 wherein the protic acid is selected from the group consisting of acetic acid, sulfuric acid, phosphoric acid and mixtures thereof.

16. The method of claim 14 comprising an additional step of washing the filter cake with one or more solvents in which the protic acid is soluble.

17. The method of claim 14 wherein the water soluble alcohol complexing agent is tert-butyl alcohol.

18. The method of claim 14 wherein the catalyst is additionally comprised of a polyether polyol.

19. The method of claim 14 wherein at least one equivalent of protic acid is utilized per equivalent of zinc hydroxyl groups.

20. An epoxide polymerization process comprising reacting an epoxide and an active hydrogen-containing initiator in the presence of a highly active substantially noncrystalline double metal cyanide complex catalyst prepared in accordance with the method of claim 1 for a time and temperature effective to form a polyether polyol.

21. An epoxide polymerization process comprising reacting propylene oxide and an alcohol initiator in the presence of a highly active substantially noncrystalline double metal cyanide complex catalyst prepared in accordance with the method of claim 14 for a time and at a temperature effective to form a polyether polyol.

* * * * *